United States Patent
Hyun et al.

(10) Patent No.: US 9,882,724 B2
(45) Date of Patent: Jan. 30, 2018

(54) METHOD OF COLLECTING PEER-TO-PEER-BASED CONTENT SENDING/RECEPTION INFORMATION

(71) Applicant: ELECTRONICS AND TELECOMMUNICATIONS RESEARCH INSTITUTE, Daejeon (KR)

(72) Inventors: Wook Hyun, Daejeon (KR); Ju-Young Park, Daejeon (KR)

(73) Assignee: ELECTRONICS AND TELECOMUNICATIONS RESEARCH INSTITUTE, Daejeon (KR)

(*) Notice: Subject to any disclaimer, the term of this patent is extended or adjusted under 35 U.S.C. 154(b) by 181 days.

(21) Appl. No.: 14/834,640

(22) Filed: Aug. 25, 2015

(65) Prior Publication Data

US 2016/0197731 A1    Jul. 7, 2016

(30) Foreign Application Priority Data

Jan. 6, 2015  (KR) .................. 10-2015-0001086

(51) Int. Cl.
| | | |
|---|---|---|
| H04L 29/06 | (2006.01) | |
| H04L 9/32 | (2006.01) | |
| G06F 21/10 | (2013.01) | |
| G06F 7/04 | (2006.01) | |
| G06F 17/30 | (2006.01) | |

(Continued)

(52) U.S. Cl.
CPC .......... *H04L 9/3247* (2013.01); *G06F 21/10* (2013.01); *H04L 63/045* (2013.01); *H04L 63/0464* (2013.01); *H04L 63/061* (2013.01); *H04L 63/126* (2013.01); *H04L 67/104* (2013.01); *H04L 2209/60* (2013.01)

(58) Field of Classification Search
None
See application file for complete search history.

(56) References Cited

U.S. PATENT DOCUMENTS 7,596,570 B1 *  9/2009  Emigh ............... G06F 11/1453
7,860,923 B2 * 12/2010  Singer ................. H04L 63/0823
                                              709/203

(Continued)

FOREIGN PATENT DOCUMENTS

| CN | 102932460 | 2/2013 |
| CN | 103051645 | 4/2013 |
| KR | 10-2005-0109065 | 11/2005 |

*Primary Examiner* — Eric Chen
(74) *Attorney, Agent, or Firm* — Kile Park Reed & Houtteman PLLC

(57) ABSTRACT

A method of collecting peer-to-peer (P2P)-based content sending/reception information is disclosed herein. In the method of collecting P2P-based content sending/reception information, a first peer accesses a second peer, and exchanges buffer maps with the second peer. The first peer requests the second peer to send a piece of content not owned by the first peer. When the reception of the piece of the content is completed, the first peer generates a receipt message and then signs the receipt message. The first peer sends the signed receipt message to the second peer. The second peer signs the signed receipt message again. The second peer sends the dually signed receipt message to a server.

11 Claims, 7 Drawing Sheets

(51) Int. Cl.
*G06F 15/16* (2006.01)
*H04L 29/08* (2006.01)

(56) References Cited

U.S. PATENT DOCUMENTS

| | | | |
|---|---|---|---|
| 2007/0214279 A1* | 9/2007 | Choi | H04L 65/4084 709/231 |
| 2007/0226365 A1* | 9/2007 | Hildreth | G11B 27/034 709/231 |
| 2007/0291915 A1* | 12/2007 | Tseitlin | G06Q 20/04 379/114.04 |
| 2009/0006853 A1* | 1/2009 | Li | H04L 63/0428 713/176 |
| 2009/0037968 A1 | 2/2009 | Liu et al. | |
| 2009/0320102 A1* | 12/2009 | Ou | H04L 12/5895 726/4 |
| 2010/0190469 A1* | 7/2010 | Vanderveen | H04L 12/14 455/406 |
| 2010/0299522 A1* | 11/2010 | Khambete | H04L 63/061 713/168 |
| 2012/0059700 A1* | 3/2012 | Darbyshire | G06F 21/10 705/14.16 |
| 2012/0099726 A1 | 4/2012 | Kim et al. | |
| 2012/0110609 A1* | 5/2012 | Guo | H04N 21/234327 725/14 |
| 2013/0031365 A1 | 1/2013 | Park et al. | |

\* cited by examiner

FIG. 7

| PEER ID | SESSION ID | PUBLIC KEY | PIECE #(D) | PIECE #(U) |

METHOD OF COLLECTING PEER-TO-PEER-BASED CONTENT SENDING/RECEPTION INFORMATION

CROSS-REFERENCE TO RELATED APPLICATION

This application claims the benefit of Korean Patent Application No. 10-2015-0001086, filed Jan. 6, 2015, which is hereby incorporated by reference herein in its entirety.

BACKGROUND

1. Technical Field

Embodiments of the present invention relate generally to a method of collecting peer-to-peer (P2P)-based content sending/reception information and, more particularly, to a method that is capable of reliably obtaining content data sending/reception information between users in the provision of a P2P-based distributed content service.

2. Description of the Related Art

A conventional server/client scheme suffers from the burdens of a server maintenance cost, the control of loads and a network cost because a single server or a plurality of servers directly sends content to terminals.

Furthermore, recently, the picture quality of multimedia content has exceeded the Full High-Definition (FHD) level, and has reached up to 4 K. Accordingly, the amounts of content have become very large, and thus have further increased the above-described burdens.

In order to reduce the burdens of content service providers, a P2P-based multimedia service in which content is directly exchanged between user terminals has been applied as an alternative to the conventional server/client scheme.

However, in the case of the current P2P-based content transfer scheme, a common user is not rewarded, although the resources (e.g., computing resources and network resources) of the common user are used. Furthermore, from the viewpoint of a content service provider, it is basically impossible to check the amounts of the content of the content service provider are being provided to respective users.

Accordingly, some P2P service providers collect the amounts of data, sent and received by respective users, from respective terminals. However, in this case, reliability is limited because data is directly transferred by user terminals and there is a possibility that the data may be falsified by users.

Related technologies include U.S. Patent Application Publication No. 2009-0037968 entitled "Using Layered Multi-stream Video Coding to Provide Incentives in P2P Live Streaming," Chinese Patent Application Publication No. 102932460 entitled "Campus Network Peer-To-Peer (P2P) Incentive Method Based on Contribution Values," and Chinese Patent Application Publication No. 103051645 entitled "Packet-based Incentive Mechanism in P2P (Peer To Peer) Network."

SUMMARY

At least one embodiment of the present invention is directed to the provision of a method that is capable of reliably obtaining information about P2P-based content distribution situations.

In accordance with an aspect of the present invention, there is provided a method of collecting P2P-based content sending/reception information, including: accessing, by a first peer, a second peer, and, by the first peer, exchanging buffer maps with the second peer; requesting, by the first peer, the second peer to send a piece of content not owned by the first peer; when the reception of the piece of the content is completed, generating, by the first peer, a receipt message and then signing, by the first peer, the receipt message; sending, by the first peer, the signed receipt message to the second peer; signing, by the second peer, the signed receipt message again; and sending, by the second peer, the dually signed receipt message to a server.

Exchanging the buffer maps may include transferring its own public key and a session key, together with its own buffer map.

The buffer maps may include information about the piece of the content owned by a corresponding peer.

The content may be divided into a plurality of logical pieces, and each of the logical pieces may be assigned a specific number.

Generating the receipt message and signing the receipt message may include signing, by the first peer, the receipt message with its own private key.

Sending the signed receipt message to the second peer may include encrypting, by the first peer, the signed receipt message using its own private key, and sending, by the first peer, the encrypted receipt message.

The signed receipt message may include one or more of a piece number, the ID of the corresponding peer, the network address of the corresponding peer, a session key, a sending completion time, average sending speed, a timestamp, and the signature data of an overall message.

Signing the signed receipt message again may include signing, by the second peer, the signed receipt message with its own private key.

The method may further include, before exchanging the buffer maps: accessing, by the first peer, the server, and requesting, by the first peer, the server to join a specific overlay network; and transferring, by the server, a list of peers having joined the specific overlay network, together with the receipt message, to the first peer when the access of the first peer is permitted.

Accessing, by the first peer, the server and requesting, by the first peer, the server to join the specific overlay network may include providing, by the first peer, its own public key to the server.

Transferring, by the server, the list of peers having joined the specific overlay network, together with the success message, to the first peer may include transferring, by the server, its own public key and a session key to the first peer.

The session key may be signed with the private key of the server.

The method may further include, between sending the signed receipt message to the second peer and signing the signed receipt message again, verifying, by the second peer, the integrity of the signed receipt message and also checking, by the second peer, whether the content included in the receipt message is correct using the public key of the first peer.

The server may store the values of the public keys of the first and second peers, and the method may further include, after sending the dually signed receipt message to the server, checking, by the server, the integrity of the dually signed receipt message using the public keys of the first and second peers.

BRIEF DESCRIPTION OF THE DRAWINGS

The above and other objects, features and advantages of the present invention will be more clearly understood from the following detailed description taken in conjunction with the accompanying drawings, in which:

FIG. 7 shows an example of a database included in the tracker server of FIG. 1.

DETAILED DESCRIPTION

Figure 1:
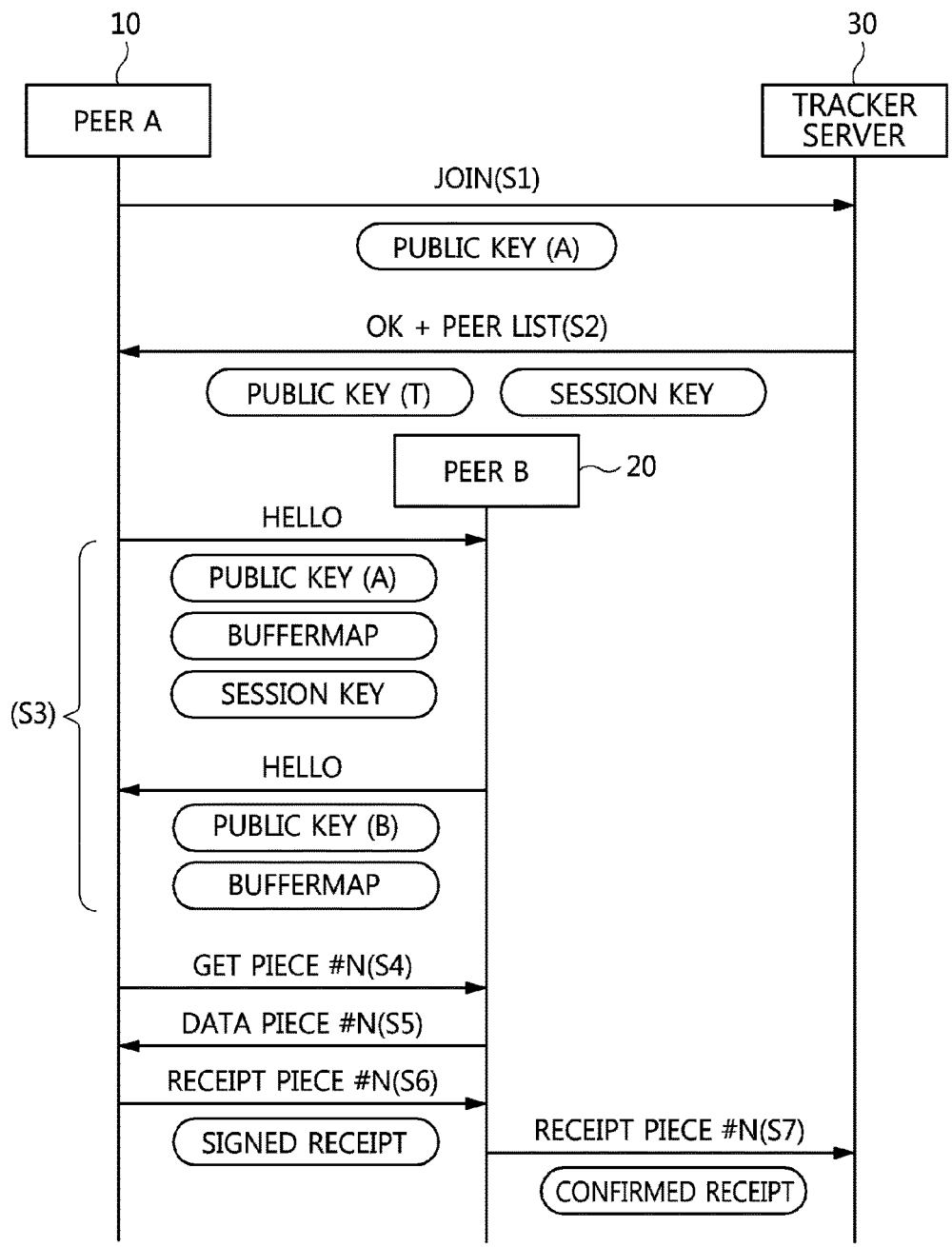
FIG. 1 is a flowchart schematically showing a method of collecting P2P-based content sending/reception information according to an embodiment of the present invention.

The present invention may be subjected to various modifications, and may have various embodiments. Specific embodiments are illustrated in the drawings, and are described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and are not used to limit the present invention. A singular form may include a plural form unless otherwise defined. The terms, including "comprise," "includes," "comprising," "including" and their derivatives, specify the presence of described shapes, numbers, steps, operations, elements, parts and/or groups thereof, and do not exclude the presence or addition of one or more other shapes, numbers, steps, operations, elements, parts, and/or groups thereof.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meanings in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 2:
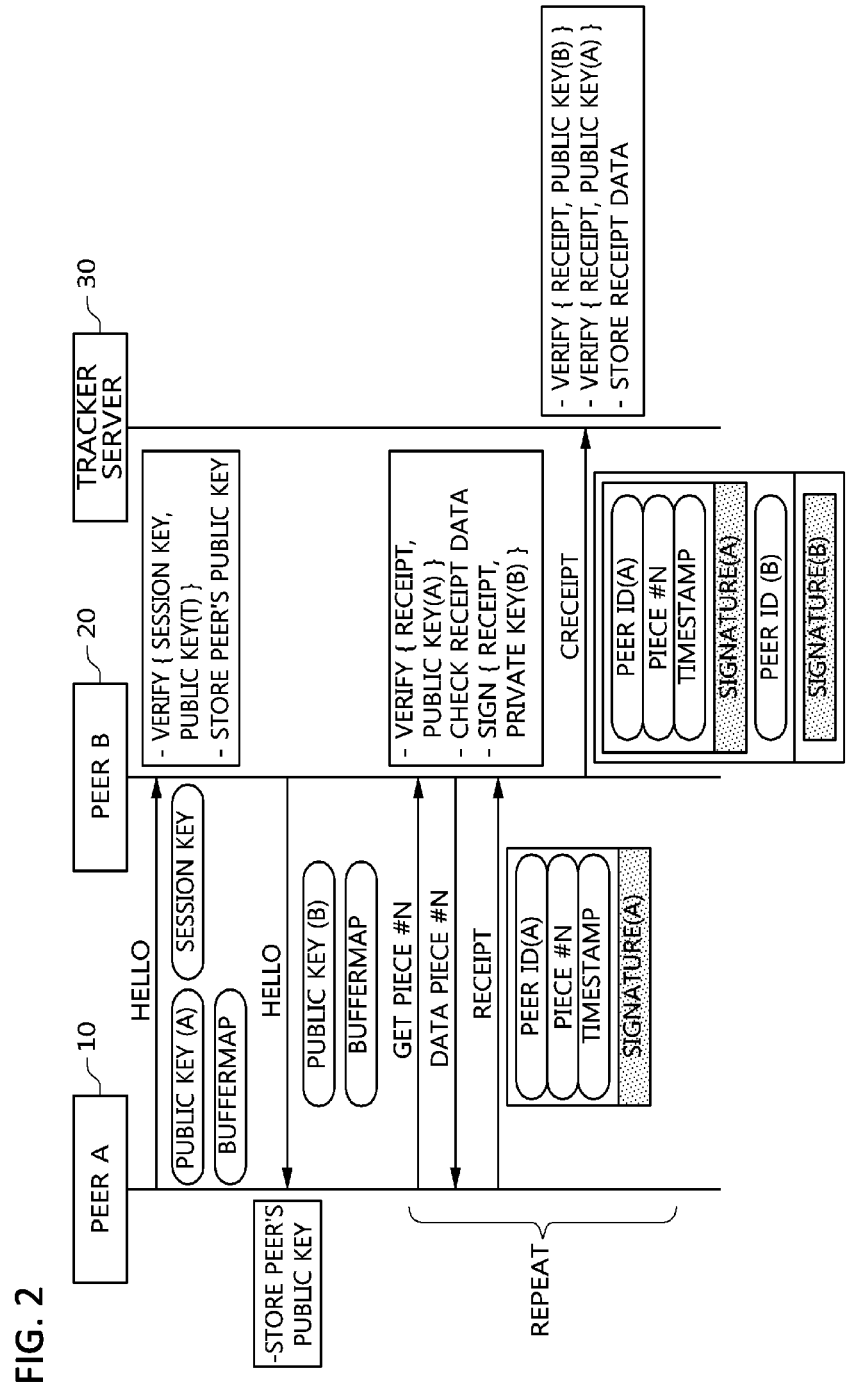
FIG. 2 is a detailed flowchart showing steps S3 to S7 of FIG. 1.

FIG. 1 is a flowchart schematically showing a method of collecting P2P-based content sending/reception information according to an embodiment of the present invention, and FIG. 2 is a detailed flowchart showing steps S3 to S7 of FIG. 1.

For example, in order to receive specific content, a peer A 10 accesses a tracker server 30 and requests to join a specific overlay network at step S1. In this process, the peer A 10 provides its own public key A to the tracker server 30. The tracker server 30 stores and maintains the public key value of the peer A 10 therein (e.g., in a database). In order to receive specific content, a peer B 20 may access the tracker server 30 and requests to join the specific overlay network. The tracker server 30 may store the public key values of other peers as well as the public key value of the peer A 10. The public keys of the peers may be used for the tracker server 30 to check whether receipt information collected from the peers has been altered.

Thereafter, if the access of the peer A 10 is permitted, the tracker server 30 transfers a list of peers that join the corresponding overlay network, along with a success message (an OK message), to the peer A 10 at step S2. In this process, the tracker server 30 transfers its own public key T and a session key to the peer A 10.

In this case, the public key T of the tracker server 30 may be used for the peer A 10 to subsequently check the validity of various types of control information received from the tracker server 30.

Furthermore, the session key of the tracker server 30 may be used to check the valid period of a session. For example, in the case of multimedia broadcasting service, a time-based voucher purchaser and a content voucher purchaser are separated and are then provided with services.

Furthermore, in order to prevent the alteration of the session key, a session ID has been signed with the private key of the tracker server 30. The peer A 10 may check whether the session ID has been altered using the public key T received from the tracker server 30.

Furthermore, the tracker server 30 transfers various types of information related to a report task to the peer A 10. The information includes operation setting information, such as the address of the tracker server to which a report message will be sent, a transfer method, and a report period.

Thereafter, the peer A 10 accesses the peer B 20 included in the received peer list and performs the task of exchanging its own buffer map and the counterpart buffer map at step S3. That is, the peer A 10 accesses the peer B 20, and transfers the session key and its own public key A, together with its own buffer map, to the peer B 20. Furthermore, the peer B 20 transfers its own public key B, together with its own buffer map, to the peer A 10.

In this case, each of the buffer maps includes information about the pieces of content owned by each of the peers. Furthermore, a single piece of content is divided into a plurality of logical pieces, and each of the pieces is to be assigned a specific number.

Furthermore, the mutually exchanged public keys A and B may be used to check the validity of receipt information. That is, the public key A of the peer A 10 may be used for the peer B 20 to check the validity of receipt information received from the peer A 10. The public key B of the peer B 20 may be used for the peer A 10 to check the validity of receipt information received from the peer B 20.

Thereafter, the peer A 10 requests the counterpart peer B 20 to send a corresponding piece using the number of the corresponding piece not owned by the peer A 10 at step S4.

Accordingly, the peer B 20 transfers the requested piece to the peer A 10 at step S5.

Once the reception of the corresponding piece has been completed, the peer A 10 generates a receipt message providing notification that the corresponding piece has been correctly received and sends the receipt message to the peer B 20 at step S6. In this process, the peer A 10 signs the receipt message with its own private key A to achieve the integrity of the receipt message. This signature may be represented by "Sign {Receipt, Private Key A}." Furthermore, the peer A 10 may encrypt the receipt message using the private key A in accordance with a policy received from the tracker server 30 or if necessary. In other words, when the peer B 20 sends a specific piece to the peer A 10, the peer A 10 generates a report message acknowledging the reception of the specific piece. In this case, the peer A 10 signs the report message using its own private key A. In this process, to achieve security, the peer A 10 may encrypt the signed message using the private key A. Thereafter, the peer B 20 may check whether a corresponding message has been correctly created through decryption and verification.

After the signature, information related to the reception and the signature data of the entire message are attached to the receipt message in the peer A 10, and the receipt message is delivered to the peer B 20. In this case, the information related to the reception may include information, such as a piece number, the ID or network address of the corresponding peer, the session key, a sending completion time, average sending speed, and a timestamp. The configuration of a message sent from the peer A 10, having received a specific piece, to a sender-side peer (i.e., the peer B 20) is illustrated in FIG. 2. As illustrated in FIG. 2, a receiver side peer (i.e., the peer A 10) signs a receipt message for received data, and sends the receipt message to the peer B 20. A counterpart peer having its own public key (i.e., the public key of the peer A 10) or a tracker server/audience measurement server may verify the integrity of the receipt message.

If a receipt message is not delivered from a counterpart within a specific time, the peer B 20 may terminate a connection with the peer A 10.

Furthermore, the peer B 20 that has received the signed receipt message verifies the integrity of the corresponding information, and checks whether content included in the receipt message is correct using the public key of the peer A 10. This verification may be represented by "Verify{"Sign{Receipt, Private Key (A)}", Public Key (A)}."

If it is determined that there is no error in the integrity and the information, the peer B 20 signs the signed receipt message again. This dual signature may be represented by "Sign{"Sign{Receipt, Private Key (A)}", Private Key (B)}."

Thereafter, the peer B 20 sends the dually signed receipt message to the tracker server 30 or a previously designated server (e.g., an audience measurement server) at step S7. The type of the dually signed receipt message is illustrated in FIG. 2. As illustrated in FIG. 2, the dually signed receipt message is data dually signed with the counterpart private key and its own private key, and can be fundamentally prevented from being altered and forged. The tracker server that has received the dually signed receipt message may verify the dually signed receipt message using the public key of each peer.

That is, the tracker server 30 that has received the dually signed receipt message checks the integrity of the data using the public keys of the peer A 10 and the peer B 20, and enters the sending/reception information into an internal database (see FIG. 2).

Meanwhile, each of the peers repeats steps S3 to S7 until it receives all the pieces of required content. Furthermore, in order to fetch a new list of peers, each peer may also repeat steps S1 and S2.

Figure 3:
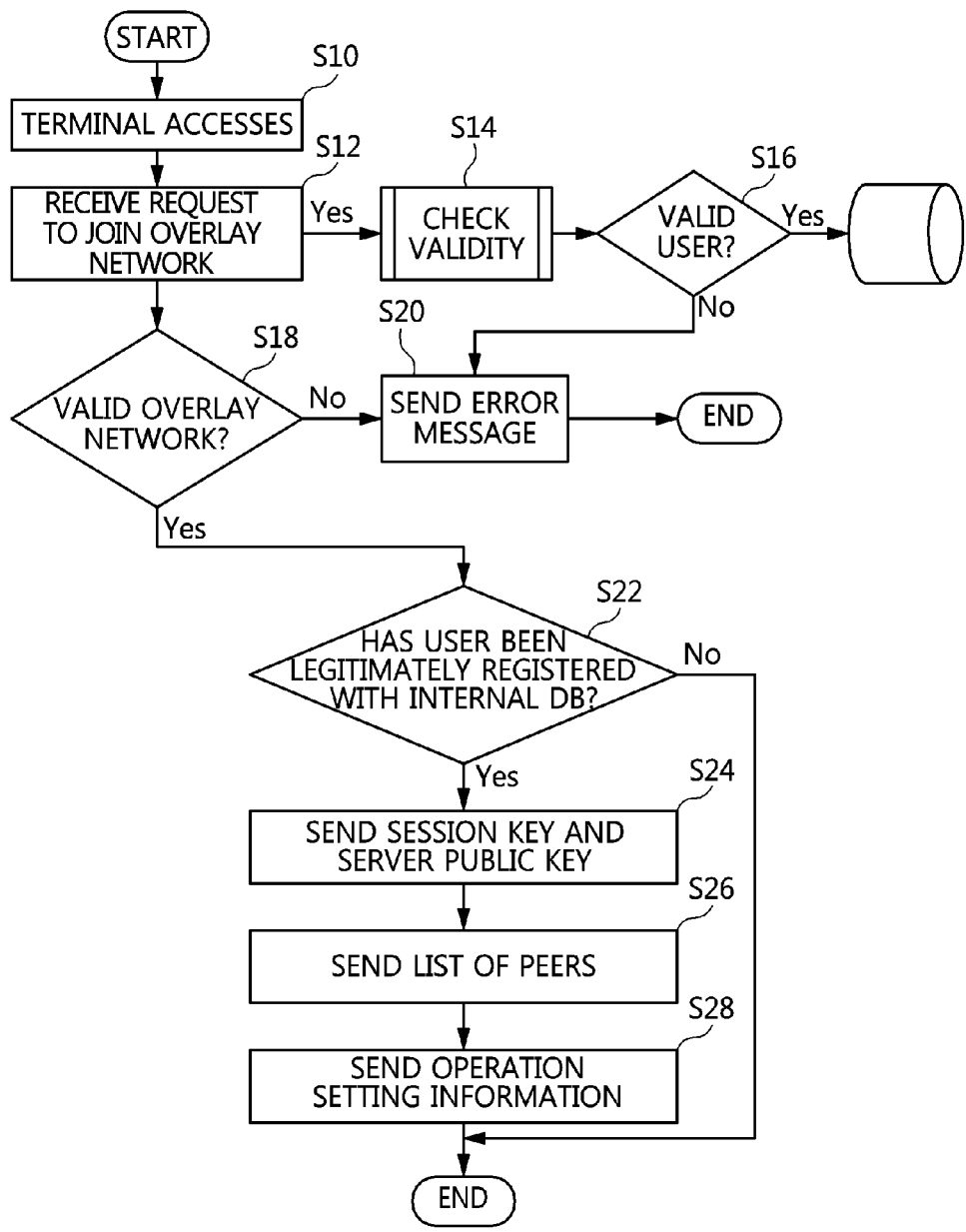
FIG. 3 is a flowchart showing the operation of the tracker server of FIG. 1.

FIG. 3 is a flowchart showing the operation of the tracker server of FIG. 1.

First, in order to receive specific content, a peer (e.g., which is assumed to be the peer A 10) accesses the tracker server 30 at step S10. In this case, the peer may be represented by a terminal, an apparatus, a device, or a node.

Thereafter, the tracker server 30 receives a request to join an overlay network from the peer at step S12.

Accordingly, the tracker server 30 checks the validity of the peer A 10 at step S14, and also determines whether the overlay network is a valid overlay network at step S18.

In the case of the validity check at step S14, the tracker server 30 receives the user ID of the peer A 10 having requested to join the overlay network, the public key of the peer A 10, and the signature data "Sign{UserID, Private Key(Peer)}" of the peer A 10, and checks the validity thereof. The signature data "Sign{UserID, Private Key (Peer)}" of the peer A 10 refers to the data (or value) of the user ID signed with the private key of the peer A 10. Meanwhile, the data provided by the user may include other data as well as the user ID.

If it is determined that the user is a valid user ("Yes" at step S16), the tracker server 30 stores the information (e.g., the user ID and the public key and signature data of the peer A 10) of the peer A 10 in its internal database. In other words, steps S14 and S16 may be viewed as the steps of checking whether data provided by a user terminal upon access is valid.

If it is determined that the user is not a valid user at step S16 or if it is determined that the overlay network is not a valid overlay network at step S18, the tracker server 30 sends an error message to the peer A 10 at step S20.

If it is determined that the overlay network is a valid overlay network at step S18, the tracker server 30 determines whether the user of the peer A 10 is a user who has been legitimately registered with the internal database at step S22.

If it is determined that the user of the peer A 10 is a user who has been legitimately registered with the internal database, the tracker server 30 sends its own public key T and a session key to the peer A 10 at step S24.

Furthermore, the tracker server 30 sends a list of peers that have joined the overlay network to the peer A 10 at step S26.

Furthermore, the tracker server 30 sends operation setting information to the peer A 10 at step S28.

The operations of the peers A and B are described below. In P2P communication, a peer may receive some of content from another peer, or may transfer received pieces to other peers at the same time. Accordingly, two processes (or threads) are simultaneously activated and separately operated.

The operations of the peer A 10 and the peer B 20 are divided and described below. However, a single peer may simultaneously perform the following two operations (i.e., the operations of FIGS. 4 and 5).

Figure 4:
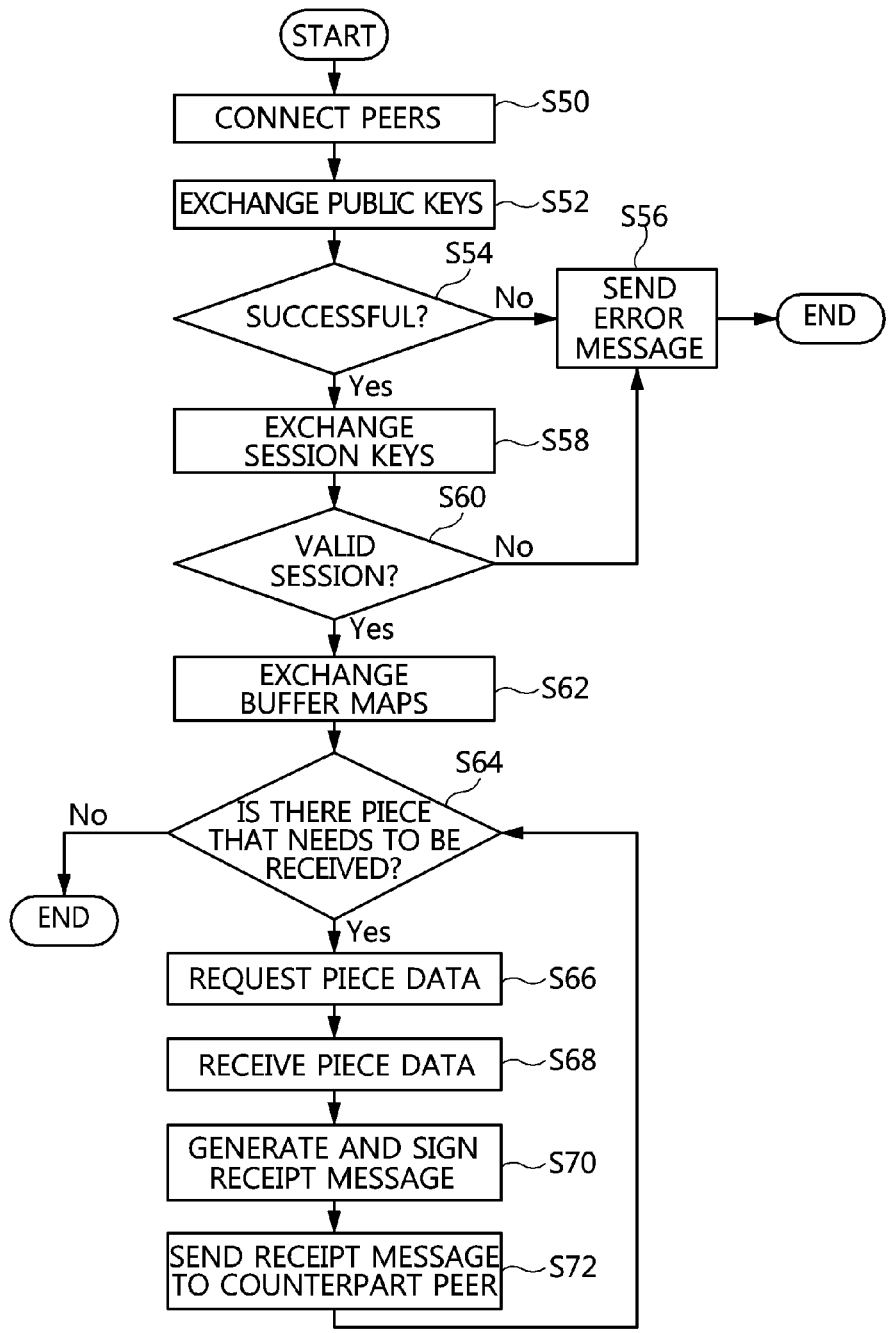
FIG. 4 is a flowchart showing the operation of the peer A of FIG. 1.

FIG. 4 is a flowchart showing the operation of the peer A of FIG. 1.

When the peer A 10 is connected to the peer B 20 at step S50, the peer A 10 and the peer B 20 exchange public keys A and B at step S52.

If the exchange of the public keys is not successful ("No" at step S54), the peer A 10 will send an error message to the peer B 20 at step S56. In this case, the peer B 20 may also send an error message to the peer A 10.

If the exchange of the public keys is successful ("Yes" at step S54), the peer A 10 and the peer B 20 exchange session keys at step S58.

If it is determined that a corresponding session is not a valid session ("No" at step S60), each of the peer A 10 and the peer B 20 sends an error message to a counterpart. If it is determined that the corresponding session is a valid session ("Yes" at step S60), the peer A 10 and the peer B 20 exchange their own buffer maps at step S62.

Thereafter, the peer A 10 determines whether there is a piece not owned by the peer A 10 (i.e., a piece that needs to be received) at step S64.

If, as a result of the determination at step S64, it is determined there is a piece that needs to be received, the peer A 10 requests the peer B 20 to send the corresponding piece at step S66.

Thereafter, the peer A 10 receives the data of the corresponding piece from the peer B 20 at step S68.

Accordingly, the peer A 10 generates a receipt message and signs the receipt message with its own private key A to achieve the integrity of the receipt message at step S70.

Furthermore, the peer A 10 sends the signed receipt message to the peer B 20 at step S72.

Figure 5:
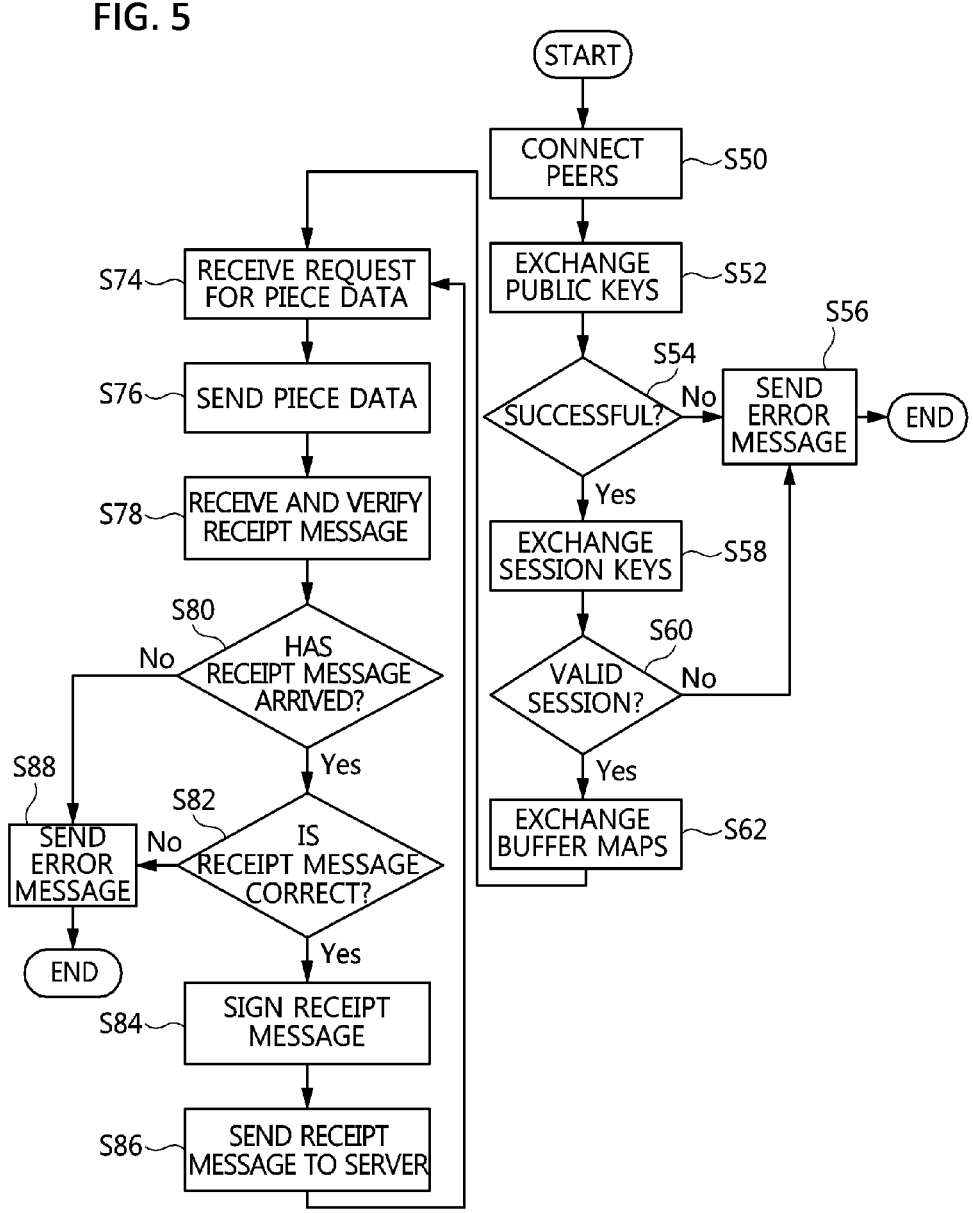
FIG. 5 is a flowchart showing the operation of the peer B of FIG. 1.

FIG. 5 is a flowchart showing the operation of the peer B of FIG. 1.

Once the peer B 20 has been connected to the peer A 10 at step S50, the peer A 10 and the peer B 20 exchange their public keys A and B at step S52.

If the exchange of the public keys is not successful ("No" at step S54), the peer B 20 will send an error message to the peer A 10 at step S56. In this case, the peer A 10 may also send an error message to the peer B 20.

If the exchange of the public keys is successful ("Yes" at step S54), the peer A 10 and the peer B 20 exchange their session keys at step S58.

If a corresponding session is not a valid session ("No" at step S60), each of the peer A 10 and the peer B 20 sends an error message to a counterpart. If the corresponding session is a valid session ("Yes" at step S60), the peer A 10 and the peer B 20 exchange their own buffer maps at step S62.

Thereafter, the peer B 20 receives a request for a piece from the peer A 10 at step S74.

Accordingly, the peer B 20 sends the requested piece to the peer A 10 at step S76.

Furthermore, the peer B 20 receives a receipt message (i.e., a signed receipt message), providing notification that the corresponding piece has been correctly received, from the peer A 10 and verifies the receipt message at step S78. If it is determined that the receipt message has not been received from the peer A 10 at step S80, the peer B 20 sends an error message to the peer A 10 at step S88.

In contrast, if it is determined that the receipt message has been received from the peer A 10 at step S80, the peer B 20 verifies whether the receipt message is correct at step S82. That is, the peer B 20 verifies the integrity of the receipt message and also checks whether content included in the receipt message is correct using the public key of the peer A 10.

If, as a result of the verification at step S82, there is a problem with the integrity or an error with the content of the receipt message, the peer B 20 sends an error message to the peer A 10.

If, as a result of the verification at step S82, there is no problem with the integrity or no error with the content of the receipt message, the peer B 20 signs the signed receipt message again at step S84.

Thereafter, the peer B 20 sends the dually signed receipt message to the tracker server 30 at step S86.

Figure 6:
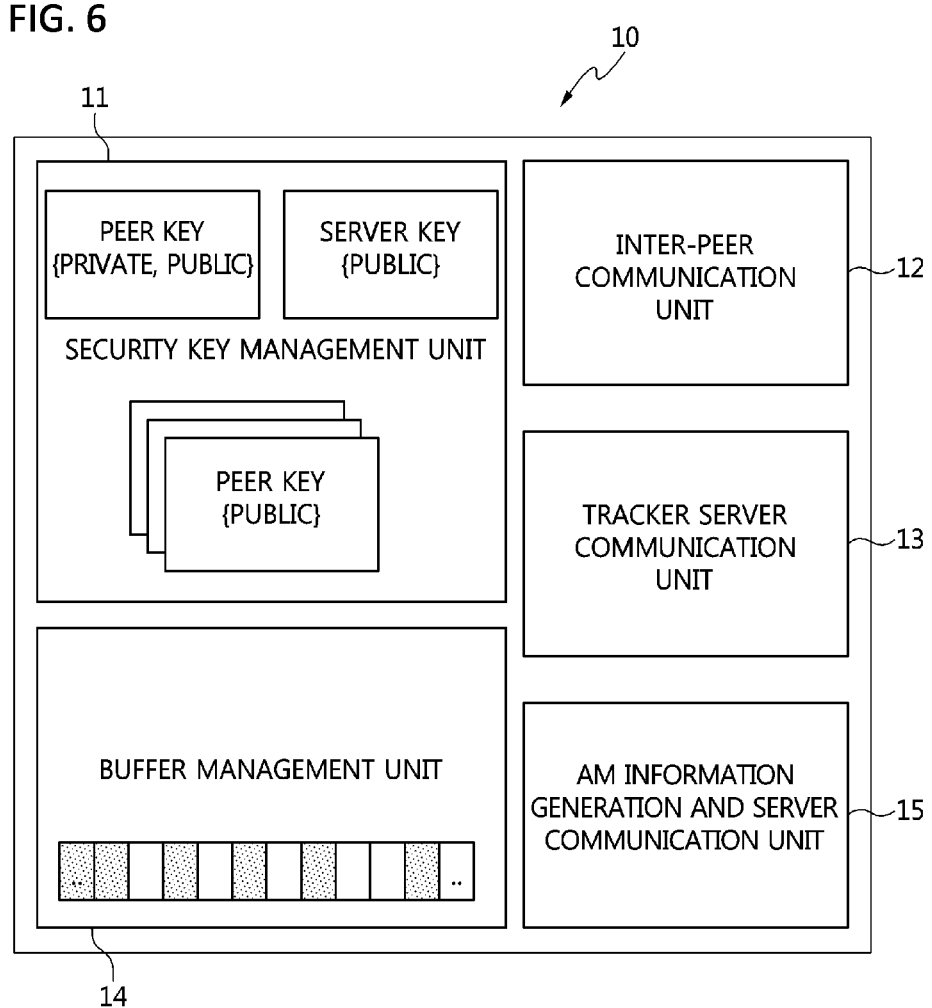
FIG. 6 shows the internal configuration of the peer of FIG. 1.

FIG. 6 illustrates the internal configuration of the peer of FIG. 1. In FIG. 6, the internal configuration of the peer A 10 is illustrated, but it may be the internal configuration of the peer B 20.

The peer includes a security key management unit 11, an inter-peer communication unit 12, a tracker server communication unit 13, a buffer management unit 14, and an audience measurement (AM) information generation and server communication unit 15.

The security key management unit 11 manages its own public key/private key, the public keys of counterpart peers collected in a process of negotiation with other peers, and the public key of the tracker server 30.

The inter-peer communication unit 12 sends and receives data to and from other peers, and performs a negotiation process for the sending and reception. The peer according to an embodiment of the present invention is different from an existing P2P peer in that the inter-peer communication unit 12 exchanges public keys in a process of negotiation between peers and the exchanged public keys are handed over to the security key management unit 11 and stored therein.

The tracker communication unit 13 communicates with the tracker server 30, and functions to join an overlay network or receive a list of peers.

Furthermore, the tracker communication unit 13 connects to the tracker server 30, receives a public key and operation setting information from the tracker server, and hands them over to the security key management unit 11 and the AM information generation and server communication unit 15.

The buffer management unit 14 functions to configure a storage space intended for the reception of content and recombine pieces that are logically divided and then sent.

The AM information generation and server communication unit 15 performs the task of signing a received piece and verifying the integrity of a counterpart receipt message.

Furthermore, the AM information generation and server communication unit 15 functions to deliver a signed receipt message to an AM server (not shown).

FIG. 7 shows an example of a database included in the tracker server or AM server of FIG. 1.

In FIG. 7, "Piece #(D)" refers to the number of pieces downloaded from another peer in a corresponding session. "Piece #(U)" refers to the number of pieces uploaded to another peer in a session.

The database of FIG. 7 manages information about peers that have joined a specific session. A public key provided when a peer first makes access, the number of pieces uploaded by the peer during a session, and the number of pieces downloaded by the peer during the session are recorded in a table of the database. More specifically, information about a peer to which each piece has been delivered and information about a peer from which each piece has been downloaded may be collected and maintained.

In accordance with at least one embodiment of the present invention, information about the exchange of data between peers can be reliably collected.

Furthermore, collected information can be used for a differentiated service and billing for a user.

Furthermore, distribution situations can be checked in quasi-real time.

An invalid user can be prevented from joining a P2P overlay network using a session key.

As described above, the exemplary embodiments have been disclosed in the present specification and the accompanying drawings. Although the specific terms have been used herein, they have been used merely for the purpose of describing the present invention, but have not been used to restrict the meanings thereof or limit the scope of the present invention set forth in the attached claims. Accordingly, it will be appreciated by those having ordinary knowledge in the relevant technical field that various modifications and other equivalent embodiments can be made. Therefore, the true range of protection of the present invention should be defined based on the technical spirit of the attached claims.

What is claimed is:

1. A method of collecting peer-to-peer (P2P)-based content sending/reception information, the method comprising:
storing, by a server, a value of a public key of a first peer and a value of a public key of a second peer;
exchanging, by the first peer and the second peer, a buffer map of the first peer with a buffer map of the second peer;
requesting, by the first peer, the second peer to send a piece of content;
sending, by the second peer, the piece of content to the first peer;
when reception of the piece of the content is completed by the first peer, generating, by the first peer, a receipt message providing notification that the piece of content has been correctly received and then signing, by the first peer, the receipt message with a private key of the first peer;
sending, by the first peer, the signed receipt message to the second peer;
verifying, by the second peer, integrity of the signed receipt message using the public key of the first peer;
when the second peer determines that there is no error in the integrity of the signed receipt message, signing, by the second peer, the signed receipt message again;
sending, by the second peer, the dually signed receipt message to the server; and
checking, by the server, integrity of the dually signed receipt message using the public key of the first peer and the public key of the second peer.

2. The method of claim 1, wherein exchanging the buffer map of the first peer with the buffer map of the second peer comprises transferring the public key of the first peer, a session key, and the buffer map of the first peer to the second peer, and transferring the pubic key of the second peer and the buffer map of the second peer to the first peer.

3. The method of claim 2, wherein the buffer map of the first peer and the buffer map of the second peer comprise information about a piece of content owned by a corresponding peer.

4. The method of claim 3, wherein:
the content is divided into a plurality of logical pieces; and
each of the logical pieces is assigned a specific number.

5. The method of claim 1, wherein sending the signed receipt message to the second peer comprises encrypting, by the first peer, the signed receipt message using the private key of the first peer, and sending, by the first peer, the encrypted receipt message to the second peer.

6. The method of claim 1, wherein the signed receipt message comprises one or more of a piece number, an ID of the corresponding peer and a network address of the corresponding peer.

7. The method of claim 1, wherein signing the signed receipt message again comprises signing, by the second peer, the signed receipt message with a private key of the second peer.

8. The method of claim 1, further comprising, before exchanging the buffer map of the first peer with the buffer map of the second peer:
accessing, by the first peer, the server, and requesting, by the first peer, the server to join a specific overlay network; and
transferring, by the server, a list of peers having joined the specific overlay network, together with a success message, to the first peer when the access of the first peer is permitted.

9. The method of claim 8, wherein accessing, by the first peer, the server and requesting, by the first peer, the server to join the specific overlay network comprises providing, by the first peer, the public key of the first peer to the server.

10. The method of claim 8, wherein transferring, by the server, the list of peers having joined the specific overlay network, together with the success message, to the first peer comprises transferring, by the server, a public key of the server and a session key to the first peer.

11. The method of claim 10, wherein the session key is signed with a private key of the server.

* * * * *